March 14, 1944.  C. B. LOWE  2,344,209
FISHING REEL
Filed Sept. 26, 1942   2 Sheets-Sheet 1
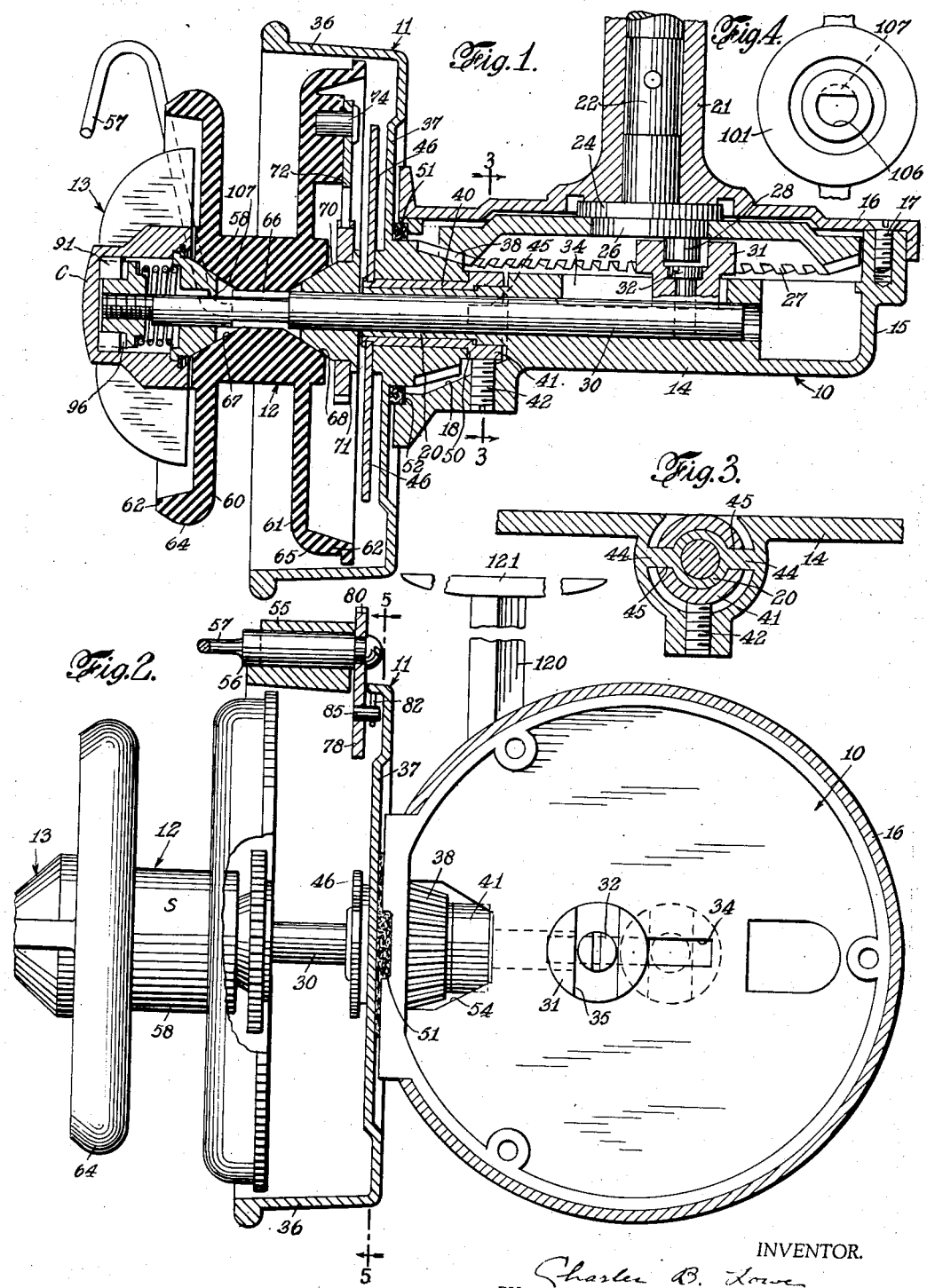
INVENTOR.
Charles B. Lowe
BY Williams, Rich & Morse
ATTORNEYS.

March 14, 1944.  C. B. LOWE  2,344,209
FISHING REEL
Filed Sept. 26, 1942  2 Sheets-Sheet 2
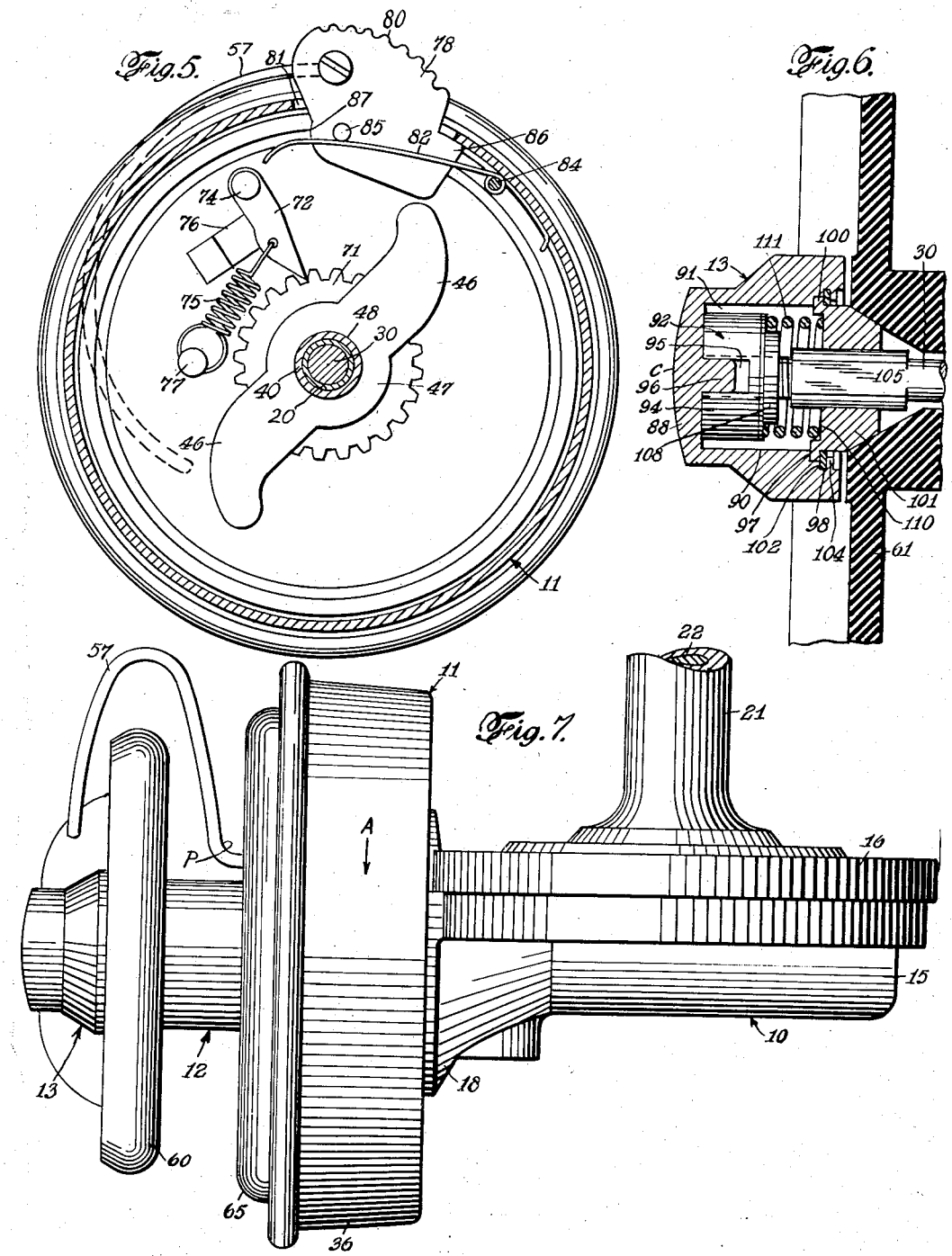
INVENTOR.
Charles B. Lowe
BY Williams, Rich & ...
ATTORNEYS.

Patented Mar. 14, 1944

2,344,209

UNITED STATES PATENT OFFICE 2,344,209

FISHING REEL

Charles B. Lowe, Stamford, Conn., assignor to Bache H. Brown, New York, N. Y.

Application September 26, 1942, Serial No. 459,751

8 Claims. (Cl. 242—84.6)

This invention relates to fishing reels of the general type shown, described and claimed in United States Letters Patent No. 2,229,470 granted January 21, 1941.

Reels of the above type make possible that method of fishing which has come to be known as "spinning" and hence the term "spinning-reel" has been adapted to designate the present type of reel, which is broadly characterized by the fact that it is so constructed as to permit the casting of extremely light lures according to a technique somewhat similar to that employed in ordinary bait-casting. Although the technique employed in casting with a spinning-reel is somewhat similar to that used in casting with a bait-casting reel, the basic principle on which the spinning-reel is constructed is distinctive in many respects, among which may be mentioned the fact that the reel-spool remains stationary during the cast and the line is released from the end of the stationary spool in such a manner that resistance to the release of the line and hence to the flight of the lure is reduced to an almost negligible value.

Important objects of the present invention are to structurally improve that type of reel which is illustrated in the above mentioned patent and at the same time render it more economical to manufacture.

To these and other ends the present invention contemplates, (1) an improved brake-unit which may be readily adjusted with nicety to effect, as desired, varying degrees of braking action on the spool to resist its rotation, as when a hooked fish refuses to yield to the reeling-in operation of the fisherman or tries to effect his get-away by making a dash for liberty against the restraining influence of the reel-spool as determined by the setting of its associated brake-unit, which setting is determined in accordance with the tensile strength of the line employed, so that the spool-resistance will be such that the spool will rotatably yield to a pull on the line well below such value as would cause the line to break; (2) an improved driving unit in conjunction with improved head and spool-units, all of which are of such construction that their respective components may be easily assembled in proper cooperative relation, while the units themselves are of such character as to enable them, as sub-assemblies, to be easily incorporated in the final assembly without necessitating delicate or intricate adjustments of any part or parts thereof in the interest of nicety in the operation of the reel as a completed unit.

Other objects and advantages of the invention will become apparent from the following description, when taken in conjunction with the accompanying drawings in which, Fig. 1 is a central, horizontal sectional view of a reel embodying the present invention, the operating handle being omitted from the driving shaft appearing fragmentally in elevation and the reel spool being shown in retracted position within the head unit.

Fig. 2 is a view of the reel as it appears from above in Fig. 1, the gear-housing cover being removed and the reel-spool being shown in its extended position with respect to the head-unit which appears for the most part in section.

Fig. 3 is a sectional view taken on line 3—3 of Fig. 1 and showing the interlocking connection between the gear-housing of the driving-unit and the inner sleeve of the head-unit, certain parts of the driving-unit being removed for the sake of clarity.

Fig. 4 is an end view of the brake-unit appearing in Fig. 1 and showing the semi-circular opening adapted to receive the flattened end of the spool carrying shaft.

Fig. 5 is a sectional view taken on line 5—5 of Fig. 2 and illustrating the relationship of the pick-up arm release wing and its cooperatively related trip-arms.

Fig. 6 is an enlarged view showing partly in section and partly in elevation various elements of the adjustable brake mechanism also appearing in Fig. 1, and Fig. 7 is a view showing the reel in elevation as viewed from beneath, when mounted in operating position on a fishing-rod, the operating handle and a portion of the driving-unit housing being omitted.

The reel herein illustrated as an embodiment of the present invention comprises four essential units or sub-assemblies, namely a driving-unit 10, a head-unit 11, a spool-unit 12 and a brake-unit 13, all cooperatively related and adapted to function collectively in the attainment of nicety of operation of the reel in its entirety.

Referring particularly to the drawings, the driving-unit 10 comprises a gear-housing 14, the bottom wall of which is provided with a barrel-like bearing 15 and the side-wall of which is adapted to receive a cover-plate 16 removably held in place by convenient means, such as screws 17. It will be noted that the housing 14 is so formed in the vicinity of the outer end of the barrel-like bearing 15, as to there provide a cup-like gear compartment 18, within which is centrally located a relatively thin-walled tubular trunnion 20, which constitutes an extension of the bearing 15 and is adapted to support, at least in part, the head-unit 11, hereinafter more particularly described. The cover-plate 16 is provided centrally with a tubular bearing 21, within which is journaled an operating shaft 22, the outer end, of which is, of course, adapted to not shown, of which is, of course, adapted to receive any appropriate type of operating handle. The shaft 22 is equipped at its inner end with a relatively large disc-like head 24, which serves to hold the shaft against displacement and is provided centrally with a relatively large but narrow trunnion or boss 26, on which is press fitted or otherwise secured a bevel gear 27. The trunnion 26 is provided with a cross-head driving-pin 28, which is disposed in a definite off-center or eccentric relation to the axis of the shaft 22 and is adapted to function, as will hereinafter more clearly appear, to move the reel-unit 12 axially with relation to the head-unit 11 in a reciprocatory manner as the shaft 22 is rotated during a reeling-in operation.

Mounted within the barrel-like bearing 15, is a longitudinally displaceable spool-supporting shaft 30, to the inner end of which is connected a cross-head 31, the cross-head being conveniently held in place on the shaft 30, as by a screw 32. The inner wall section of the barrel-like bearing 15 is provided with a slot 34, adapted to slidably receive the shank portion of the cross-head 31 which is adapted to hold that shaft against rotation at all times. The outer or disc-like end of the cross-head 31 is provided with a transverse slot 35, which is of such depth and width as to accommodate the cross head-pin 28 for relative translation therein as the operating handle 22 is rotated to effect reciprocatory movement of the shaft 30.

The head-unit 11 comprises a rotatable cup-like member, hereinafter referred to as a pick-up casing 36, the bottom wall 37 of which is centrally recessed over a relatively large area, as shown, and is secured to the outer end of a beveled gear 38, journaled on a sleeve-like bearing 40. The bearing 40 is removably supported on the tubular trunnion 20 and is provided at its inner end with a relatively thick walled portion 41, having an internal shoulder formed thereon, as shown, and adapted to embrace the shouldered portion of the inner end of the trunnion. The sleeve-like bearing 40 is held against longitudial displacement by a set-screw 42, passing through the gear-housing 14 and engaging the wall portion 41 of the bearing 40. Although the set-screw 42 in no small measure serves to retain the bearing 40 against rotation, the bearing is definitely locked against such movement through the medium of a pair of webbed-like gussets 44, formed integral with the tubular trunnion 20 and the adjacent wall portions of the gear-housing 14, as shown most clearly in Fig. 3, the webbed-like gussets being dimensioned to snugly fit within a pair of notches 45 formed in the wall portion 41 of the bearing 40.

With the outer end of the bearing 40 there are associated a pair of trip-arms 46, the outer ends of which are curved in the direction of rotation of the head-unit 11 and the inner ends of which are formed integral with a disc-like hub 47. The hub 47 is provided with a central opening 48, which accommodates the outer end of the bearing 40, to which such hub is permanently secured. The hub 47, in conjunction with a shoulder 50, with which the bearing 40 is provided at its inner end, serves to restrain the gear 38 and its associated pick-up casing 36, against longitudinal displacement, although such hub and shoulder are so spaced from each other as to permit free rotation of the gear 38 and the pick-up casing 36 about their common axis.

In order that the gear-housing 14 may be sealed against the escape of grease or other lubricant and guarded against the ingress of water at its juncture with the head-unit 11, there is interposed between such housing and head a ring-like gland-washer 51 of suitable material, such as felt. The washer 51 snugly embraces the gear 38 and is closely confined intermediate the bottom wall of the pick-up casing 36 and the annular or continuous gland-seat 52, which is formed in the gear-housing 14 in a concentric relation to the gear compartment 18, the inner wall of which is apertured, as shown at 54, in order that the gears 27 and 38 may engage each other.

The pick-up casing 36 is provided on its outer perimeter with a bearing 55 within which is journaled a relatively short shaft 56, the axis of which is at all times maintained in parallelism with the reciprocatory shaft 30 on which the spool-unit 12 is carried and by which that unit is moved from its retracted position, shown in Fig. 1 to its extended position shown in Fig. 2, and vice-versa, incident to rotation of the head-unit 11. With the shaft 56, there is associated a pick-up finger 57, which, near its juncture with the shaft 56, is bent at point P to a relatively sharp angle, and, throughout the major portion of its length, is so shaped as to simulate a spiral. The pick-up finger 57 is inclined generally forwardly and its outer or extreme end is disposed at all times in a plane intersecting the axis of the shaft 30 at a point well ahead of the spool-unit 12 in order to insure such engagement of the pick-up finger with the fishing-line, not shown, as will enable that finger to move the line into position to be wound on the spool-unit 12.

The spool-unit 12 includes a spool S, comprising an arbor 58 provided at its ends with flanges 60 and 61, the former of which is of lesser diameter than the latter and the outer margins of each of which are provided with outwardly extending skirt-like extensions 62, the peripheries of which are relieved, as shown, so as to provide outwardly curved surfaces 64 and 65, the former of which facilitates free and easy removal of the line from the forward end of the spool incident to the making of a cast. The arbor 58 is provided centrally with an opening 66, which is adapted to receive the shaft 30 and is so flared or shaped at its opposite ends as to there provide inwardly tapering bearing or brake surfaces 67 and 68. To the shaft 30 there is rigidly secured in concentric relation thereto, a frusto-conical brake-bearing 70, to which is rigidly connected, as by press fit, a ratchet-like click-wheel 71, the teeth of which are adapted to engage a click-pawl 72, which, as will be readily understood, serves to audibly indicate the existence of a condition responsible for rotation of the spool 58 with respect to the shaft 30, as for example, when a hooked fish refuses to yield to the reeling-in operation of the fisherman or tries to effect his get-away by making a dash for liberty against the restraining influence of the reel-spool, as determined by the setting of its associated brake-unit 13, hereinafter more particularly described. The click-pawl 72 is pivotally connected by a screw 74 to the rear wall of the spool-flange 61 and is normally maintained by a tension-spring 75 in engagement with a stop-lug 76, carried by the spool-flange, the spring 75 being connected at one of its ends to the click-pawl 72 and at the other of its ends to an anchor-pin 77, carried by the spool-flange 61.

During such times as a reeling-in operation is being carried out, the pick-up finger 57 is retained in its retracted position as shown in Figs. 1 and 7, in which case the fishing-line is maintained in engagement with the pick-up arm, at point P over which it slides, with the result that the line is laid down evenly on the spool S, as such spool is reciprocated by the shaft 30, while the pick-up casing 36, together with its associated pick-up arm is rotated about the axis of the spool. To facilitate a cast, it becomes necessary to disengage the pick-up finger 57 from the fishing-line by moving that finger outwardly about the axis of the shaft 56 to such position, with respect to the spool S, as will permit the fishing-line to be unobstructively stripped from the forward end of the spool. In order that the pick-up finger 57 may be conveniently displaced as and for the purpose mentioned, the shaft 56 is equipped with a pick-up finger release-wing 78. The release-wing 78 at its outer end is knurled, as shown at 80, in order that it may be conveniently manipulated by thumb action to move the pick-up arm to its outer or extended position. The pick-up casing 36 is provided with a slot 81, through which the release wing projects a substantial distance into that casing in order that it, when moved to swing the pick-up finger to its extended position, may assume such position that engagement between it and one or the other of the trip-arms 46 may be effected at or substantially at the instant a reeling-in operation is initiated, so that the pick-up finger will be automatically returned to its pick-up position and thus conditioned to engage the line and move it to the point P, over which it slides during the reeling-in operation. In order that the finger-release wing 78, may be temporarily held in each of its two extreme positions, there is provided a retaining spring 82, which is anchored by a pin 84 to the rear wall 37 of the pick-up casing, the free end of the spring being in engagement with and exerting an outward thrust on a pin 85, secured to the release wing 78 in such position that the spring is enabled to effect a snap movement of that wing into its respective extreme positions as such positions are approached. In order that the release-wing 78 may be definitely stopped in each of its two extreme positions, such swing is provided with a pair of shoulders 86 and 87, the former of which engages the wall of the pick-up casing 36 from within and the latter of which engages that wall at one end of the slot 81 within which the release wing is accommodated. In this connection it is to be observed that the shoulder 86 serves to limit movement of the pick-up arm 57 to line pick-up position, whereas the shoulder 87 serves to limit movement of that arm to its extended position, in which former position the reel is conditioned for a reeling-in operation and in which latter position the reel is so conditioned as to enable a casting operation to be effected.

Referring now to the brake-unit 13, it will be noted that such unit constitutes in itself a complete sub-assembly and as such is readily detachable from the shaft 30, on the outer end of which it is mounted. The brake-unit 13 comprises a wing-cap C, the outer or end wall 88 of which and the cylindrical side wall 90 of which define a cup-like pocket 91, within which is carried a thrust-assembly 92, through the medium of which varying degrees of braking action on the reel-spool S may be readily effected as desired. The thrust-assembly 92 includes an internally screw threaded pressure-head 94, having screw thread engagement with the outer end of the shaft 30. The pressure-head 94 is provided with a pair of diametrically opposed notches 95, which are of such dimensions as to slidably receive a pair of locking lugs 96 carried by and preferably formed integral with the end wall 88 of the wing-cap C. As shown most clearly in Fig. 6, a substantial clearance is provided intermediate the inner surface of the wall 90 and the peripheral surface of the pressure-head 94, so that such pressure-head may be free to move longitudinally of the wing-cap C, under conditions hereinafter more particularly described. The wall 90 of the wing-cap C is provided in the vicinity of the outer end of the cup-like pocket 91 with an annular ledge 97, between which and an annular retaining-washer 98 is confined a peripheral flange 100 carried at the base of a frusto-conical brake-bearing 101 which corresponds in a large measure to the brake-bearing 70 hereinbefore described. The annular retaining-washer 98 is seated on an annular ledge 102 and may be conveniently locked in its seated position by upsetting into engagement therewith a portion of the metal of the wing-cap C, so as to provide an effective locking-flange 104. It is to be noted that although the locking-flange 104 serves to effectively retain the brake-bearing 101 in an assembled relation to the wing-cap C, it is spaced a sufficient distance from the annular ledge 97 to permit free relative rotation between the cap and its associated brake-bearing. As will be readily understood from an inspection of Figs. 1 and 6, the outer end of the shaft 30 is provided adjacent its screw-threaded portion with a flat surface 105, with the result that the shaft in the vicinity of such surface presents in cross section a semicircular contour, corresponding, as will be understood from Figs. 1 and 4, to the shape of one end of the central passage 106, with which the brake-bearing 101 is provided. The passage 106 which, except for one end thereof, is circular, is rendered semi-circular in part, by providing the brake-bearing 101 with a web-like lug 107. This lug 107 may be conveniently formed for example, by drilling a circular hole from one end of the brake-bearing 101 to within a reasonable distance from the other end of that bearing and thereafter punching, as by a die, a semi-circular hole in the remaining relatively thin-wall bottom of the drill hole, leaving the lug 107 intact and dimensioned to snugly engage the flat surface 105 of the shaft 30. The lug 107, in cooperation with the flat surface 105 of the shaft 30, serves to lock the bearing 101 against turning, but the journal-like connection which is afforded between the brake-bearing and the wing-cap C through the medium of the peripheral flange 100 with which that bearing is provided enables the wing-cap to be rotated with respect to the shaft 30, in order to effect varying degrees of braking action on the reel-spool S, as and for the reasons hereinafter more particularly described.

The pressure-head 94 is provided centrally with a cylindrical boss 108 and the brake-bearing 101 is formed with a cup-like recess 110, such boss and recess being cooperatively related and serving to retain, in concentric relation to the shaft 30, a compression spring 111, which is confined intermediate the pressure-head 94 and the brake-bearing 101. By reason of the relationship of the spring 111 to the pressure-head 94 and the brake-bearing 101, which engages the brake-surface 67, it will be understood that varying degrees of pressure may be exerted on the reel-spool S through the medium of the brake-bearing by adjusting the pressure-head 94 longitudinally of the shaft, such adjustment being effected by rotating the wing-cap C in one direction or the other and thus causing the pressure-head, by reason of its interlocked but yet slidable connection with the wing-cap, to rotate in unison with that cap. In the particular embodiment of the present invention, the braking action exerted on the reel-spool S by the brake-bearing 101, in conjunction with the brake-bearing 70, may be varied from a substantially zero value to a value of such proportions as will render the reel-spool incapable of rotation with respect to the shaft 30 under all average or normal fishing conditions. Moreover, the relationship to each other of the various elements entering into the brake-unit 13, which includes the brake-bearings 70 and 101, is such that a nicety of variation in pressure exerted by such bearings on the inwardly tapering brake-surfaces 67 and 68 is realized throughout the entire range of brake-unit adjustment since the value of the braking action may be varied by relatively small increments through the medium of the adjustable wing cap C. Additionally, it is to be observed that the brake-bearings 70 and 101 afford substantial bearing supports for the spool S at opposite ends of its arbor 58, which at no point directly engages its associated shaft 30; and, that since the brake-bearings are frusto-conical in character and are complementary to the brake or bearing surfaces 67 and 68, any wear that may result as between the bearing or brake-surfaces 67 and 68 and their respectively associated brake-bearings 101 and 70 is automatically compensated due to the fact that the compression spring 111 of the brake-unit 13 normally urges these bearings relatively toward each other and maintains them in true face-to-face engagement with the brake or bearing surfaces at all times.

The fishing reel embodying the present invention is intended, of course, for use, with a suitable fishing rod, preferably one having some of the characteristics of a bait-casting rod, but more nearly simulating the conventional fly-rod from a standpoint of dimensions, weight and flexibility. In order that the reel may be conveniently attached to the rod in proper location at or near the rod-butt, a suitable support is provided in the form of a suspension-post 120, formed integral with the gear-housing 14 and provided at its upper end with a suitable base 121, of conventional design, adapted to be detachably secured to the fishing rod in accordance with well known methods now employed in securing ordinary fly-rod reels on the usual type of fly-rod reel seat, with which the standard or present day fly-rod is customarily equipped. The nature of the reel embodying the present invention requires that it be suspended from the fishing-rod at a substantial distance and to that end the suspension-post 120, which, like its associated base 121 is herein only fragmentally shown, is of an appropriate length to correctly position the reel with relation to its associated rod. The reason for spacing the reel at a substantial distance from the rod resides in the fact that clearance must be provided in order that the head-unit 11 and its associated pick-up arm 57 may function unobstructedly and in order that the rod will not interfere with the whirling or spinning motion of the line as it is released or stripped from the front end of the reel-spool S when executing a cast. In this connection it may be well to point out that as the line is released or stripped from the reel-spool S, which is stationary during the making of a cast, the line is of necessity whirled or spun about an imaginary $x$—$x$ axis which is coincident with the axis of the shaft 30 and its associated spool S, the orbit described by the spinning line under the action of centrifugal force being, on its imaginary $x$—$x$ axis, of a dimension approaching, if not actually exceeding the over-all transverse dimension of the reel-head 11.

In so far as the method of assembling the various elements entering into the reel embodying the present invention is concerned, it is believed unnecessary to enter upon any elaborate discourse as to the procedure to be followed, since such procedure will be readily understood by those skilled in the art. However, it will be well to point out in connection with the driving-unit 10 and the head-unit 11 that these units are so constructed as to permit them to be easily adjusted with respect to each other in the final reel assembly to effect an accurate intermeshing relationship of the gears 27 and 28 to each other. In this connection, it will be observed that the sleeve-like bearing 40, which constitutes an element of the head-unit 11 and on which the gear 38 is journaled, may be moved longitudinally of the tubular trunnion 20 to effect the proper meshing relationship of the gears 27 and 38 after placing the bearing on the trunnion in substantially its proper position. After adjusting the bearing 40 on the trunnion 20 to effect the proper meshing of the gears 27 and 38, the bearing is effectively locked in its final position of adjustment by the set-screw 42, which serves to hold the driving-unit 10 and the head-unit 11 together in the final reel assembly.

In use, the reel is attached, in the manner hereinbefore explained, to a fishing rod at or relatively near the butt of the rod from which it depends, the axis of the reel being disposed in a parallel relation to the rod with its front or spool end extending generally toward the rod-tip. In this position the line is free to move unobstructively from the reel-spool S and to pass freely through the rod-guides when executing a cast. In order to condition the reel for the making of a cast, the reel-head 11 is first so positioned that the bearing 55, and consequently the shaft 56 by which the pick-up finger 57 is supported, is in its lowermost position, that is to say, in such position that the spool-supporting shaft 30 is disposed intermediate the fishing-rod and the pick-up finger supporting shaft 56. After thus far conditioning the reel for the making of a cast, the pick-up finger 57 is moved, by thumb action, through the medium of the release-wing 73 to its extended position, so as to obviate any interference to the release of the line from the reel-spool S by the pick-up finger, which is maintained during the cast in its extended position by the retaining spring 82. While the pick-up finger 57 is thus maintained in extended position, the cast is executed much according to the principle of ordinary bait-casting, the line being stripped from the reel-spool S under the flight-action of the lure and at the same time undergoing a whirling or spinning action as it passes over the end-flange 60 of the spool. When it becomes desirable to halt the flight of the lure, as upon substantial completion of the cast, the fisherman simply moves his forefinger into engagement with the whirling line or otherwise obstructs its orbital movement, as by so moving the reel handle (not shown) as to cause the pick-up finger 57 to snap into line-engaging position. After the lure has landed at the end of its trajectory, it may be manipulated, in retrieve, according to such technique as the inherent characteristics of the lure may dictate. In order to effect a retrieve or reeling-in of the lure, it becomes necessary merely to rotate the operating-shaft 22, through the medium of its associated handle, in such direction as will cause the reel-head 11 to rotate in the direction of the arrow A, appearing in Fig. 7, the handle, in the present embodiment of the invention being disposed for left-hand operation inasmuch as the reel in the present instance is designed for right-handed casting. Substantially at the instant rotation of the reel-head 11 is initiated, engagement of the release-wing 78 with one or the other of the trip-arms 46 is established, with the result that the release-wing is moved, in a counterclockwise direction as viewed in Fig. 5, with a snap action under the influence of the retaining-spring 82, thus causing the pick-up finger 57 to move into line engaging position where it, upon contact with the line, will automatically pick-up the line and carry it over the front flange 60 of the reel-spool S and cause it to slide into a position at or in the immediate vicinity of the point P. Movement of the pick-up finger 57 to its pick-up position and movement of the line over that finger to the point P thereon occurs, as will be readily understood, during the relatively short period which is required to rotate the reel-head 11 to the extent of not more than 180° in any event. After the line assumes its position at point P on the pick-up finger, it is wound onto the reel-spool S in an evenly distributed manner since that spool is reciprocated along its longitudinal axis as the reeling-in operation is carried out preparatory to the making of another cast.

Although only one form of the present invention is herein shown and described, it will be understood that various changes may be made without departing from the spirit of the invention, as for example, the reel may be constructed for right hand reeling-in operation in order to accommodate a left handed caster, in which case many of the elements entering into the present construction would, of course, be in complementary reverse to those herein illustrated.

What is claimed is:

1. In a fishing reel, a driving-unit comprising a driving-gear, a gear-housing accommodating said gear and including a barrel-like bearing; a head-unit comprising a sleeve-like bearing mounted for longitudinal adjustment on the first mentioned bearing, a driven-gear journaled on the second mentioned bearing and meshing with said driving gear, and a pick-up casing secured to said driven gear; an interlocking connection afforded between said gear-housing and the second mentioned bearing, whereby that bearing is maintained against rotation with respect to the first mentioned bearing; and securing means functioning in conjunction with the second mentioned bearing for maintaining it against longitudinal displacement with relation to the first mentioned bearing and for maintaining said units in an assembled relation to each other.

2. In a fishing reel, a driving-unit; a head-unit including a pick-up casing mounted for rotation by said driving-unit; a spool-supporting shaft mounted for reciprocation by said driving-unit incident to rotation of said pick-up casing; a spool-unit including a spool mounted on said shaft for reciprocation therewith and for rotation with respect thereto; a brake-unit including a pair of frusto-conical brake-bearings held against rotation on said shaft and directly supporting said spool for rotation about its axis, and adjustable pressure means for urging said frusto-conical brake-bearings relatively toward each other, whereby varying degrees of braking action may be imparted to said spool.

3. In a fishing reel, a driving-unit; a head-unit including a pick-up casing mounted for rotation by said driving-unit; a spool-supporting shaft mounted for reciprocation by said driving-unit incident to rotation of said pick-up casing; a spool-unit including a spool mounted on said shaft for reciprocation therewith and for rotation with respect thereto; a brake-unit including a pair of frusto-conical brake-bearings held against rotation on said shaft and directly supporting said spool for rotation about its axis, a pressure-head carried by said shaft for longitudinal adjustment thereon, a compression spring disposed intermediate said pressure head and one of said frusto-conical brake-bearings and serving to urge said brake-bearings relatively toward each other and to exert varying degrees of braking action on said spool by way of said brake-bearings.

4. In a fishing reel, a driving unit; a head-unit including a pick-up casing mounted for rotation by said driving-unit; a spool-supporting shaft mounted for reciprocation by said driving unit incident to rotation of said pick-up casing; a spool-unit including a spool supported on said shaft for reciprocation therewith and having a central opening presenting at its opposite ends a pair of inwardly tapered brake surfaces; a brake-unit including a pair of frusto-conical brake-bearings held against rotation on said shaft and supporting said spool for rotation about its axis; and adjustable pressure means for urging said brake-bearings relatively toward each other, whereby varying degrees of braking action may be imparted to said spool.

5. In a fishing reel, a driving-unit; a head-unit including a pick-up casing mounted for rotation by said driving-unit; a spool-supporting shaft mounted for reciprocation by said driving unit incident to rotation of said pick-up casing; a spool-unit including a spool supported on said shaft for reciprocation therewith and having a central opening presenting at its opposite ends a pair of inwardly tapered brake surfaces; a brake-unit including a pair of frusto-conical brake-bearings held against rotation on said shaft and supporting said spool for rotation about its axis, a pressure-head carried by said shaft for longitudinal adjustment thereon, a compression spring disposed intermediate said pressure-head and one of said brake-bearings and serving to urge said brake-bearings relatively toward each other and to exert varying degrees of braking action on said spool by way of said brake-bearings.

6. In a fishing reel, a spool supporting shaft; a spool-unit including a spool journaled on said shaft; means for reciprocating said shaft and said spool in unison along their common axis; means for winding a fishing line about said spool as said shaft is reciprocated; a brake-unit including a cap, a pressure-head having screw-thread connection with said shaft and interlocked with said cap for rotation therewith and for sliding displacement therein, a frusto-conical brake-bearing supporting said spool and secured to said shaft, a second frusto-conical brake-bearing supporting said spool and rotatably carried by said cap and locked against rotation on said shaft, and a spring disposed intermediate the second named brake-bearing and said pressure-head for urging said brake-bearings relatively toward each other as said pressure-head is displaced incident to rotation of said cap, whereby varying degrees of braking action may be imparted to said spool.

7. In a fishing reel, a spool supporting shaft; a spool-unit including a spool journaled on said shaft; means for reciprocating said shaft and said spool in unison along their common axis; means for winding a fishing line about said spool as said shaft is reciprocated; a brake-unit including a cap, a pressure-head having screw-thread connection with said shaft and interlocked with said cap for rotation therewith and for sliding displacement therein, a brake-bearing secured to said shaft and presenting a frusto-conical bearing surface disposed within and serving as a journal for said spool, a second brake-bearing rotatably carried by said cap and locked against rotation on said shaft, the second named brake-bearing being disposed within and serving as a journal for said spool, and a spring disposed intermediate the second named brake-bearing and said pressure-head for urging said brake-bearings relatively toward each other as said pressure-head is displaced incident to rotation of said cap, whereby varying degrees of braking action may be imparted to said spool.

8. In a fishing reel, a driving-unit comprising a driving-gear, a gear-housing accommodating said gear and including a barrel-like bearing; a head unit comprising a sleeve-like bearing surrounding said barrel-like bearing; a driven gear journaled on said sleeve-like bearing and meshing with said driving gear; an interlocking connection between said gear-housing and said sleeve-like bearing, whereby that bearing is maintained against rotation with respect to the barrel-like bearing; and securing means cooperating with said gear-housing and said sleeve-like bearing for maintaining the latter against longitudinal displacement with relation to the barrel-like bearing and for maintaining said units in an assembled relation to each other.

CHARLES B. LOWE.